Aug. 1, 1950  T. R. KOMLINE  2,517,117
CLARIFIER
Filed Sept. 17, 1946  4 Sheets-Sheet 1
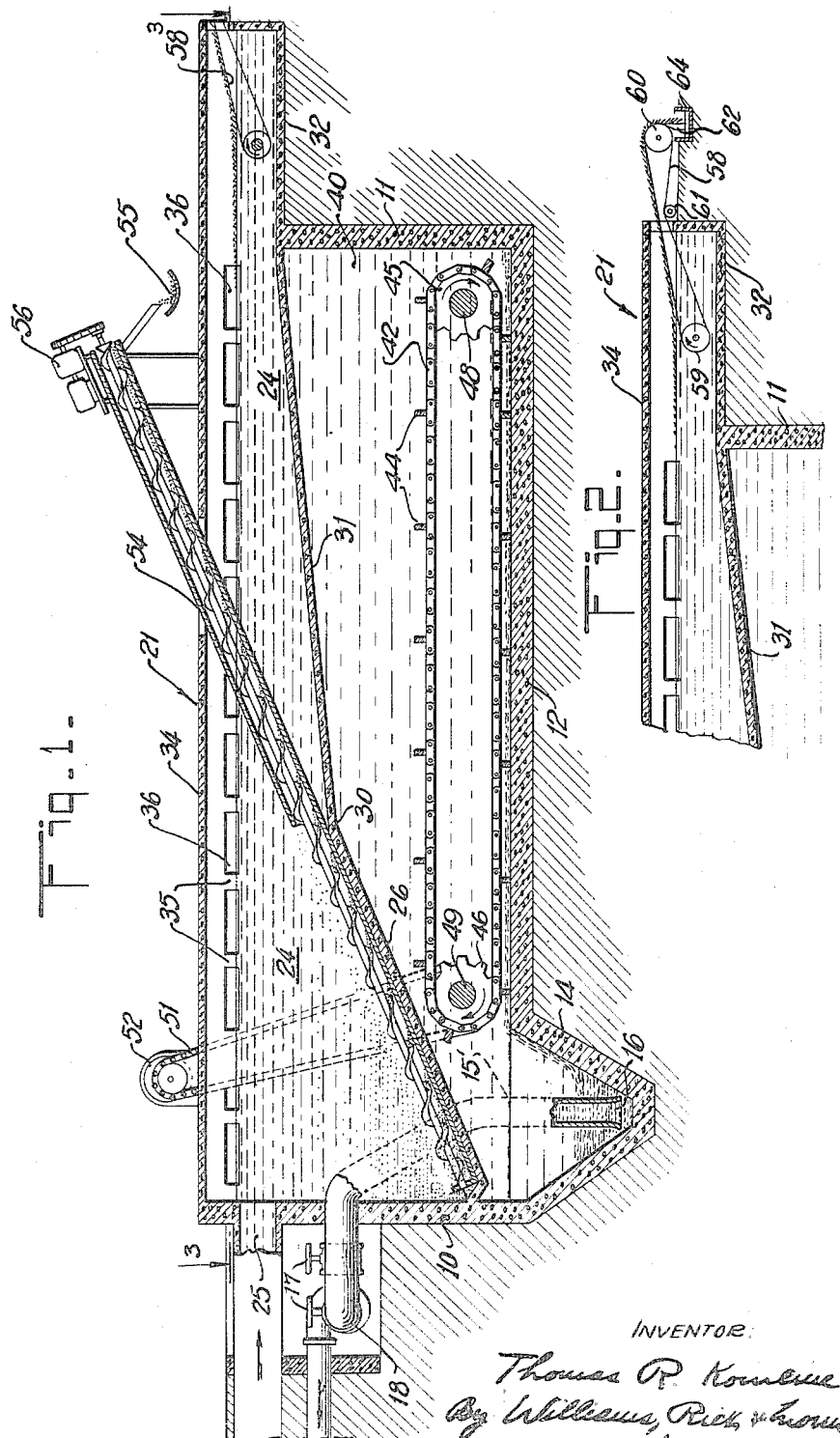
INVENTOR:
Thomas R. Komline
By Williams, Rich & Morse
ATTORNEYS Aug. 1, 1950  T. R. KOMLINE  2,517,117
CLARIFIER Filed Sept. 17, 1946  4 Sheets-Sheet 2

INVENTOR:
Thomas R. Komline
By William Rich & Thoms
ATTORNEYS

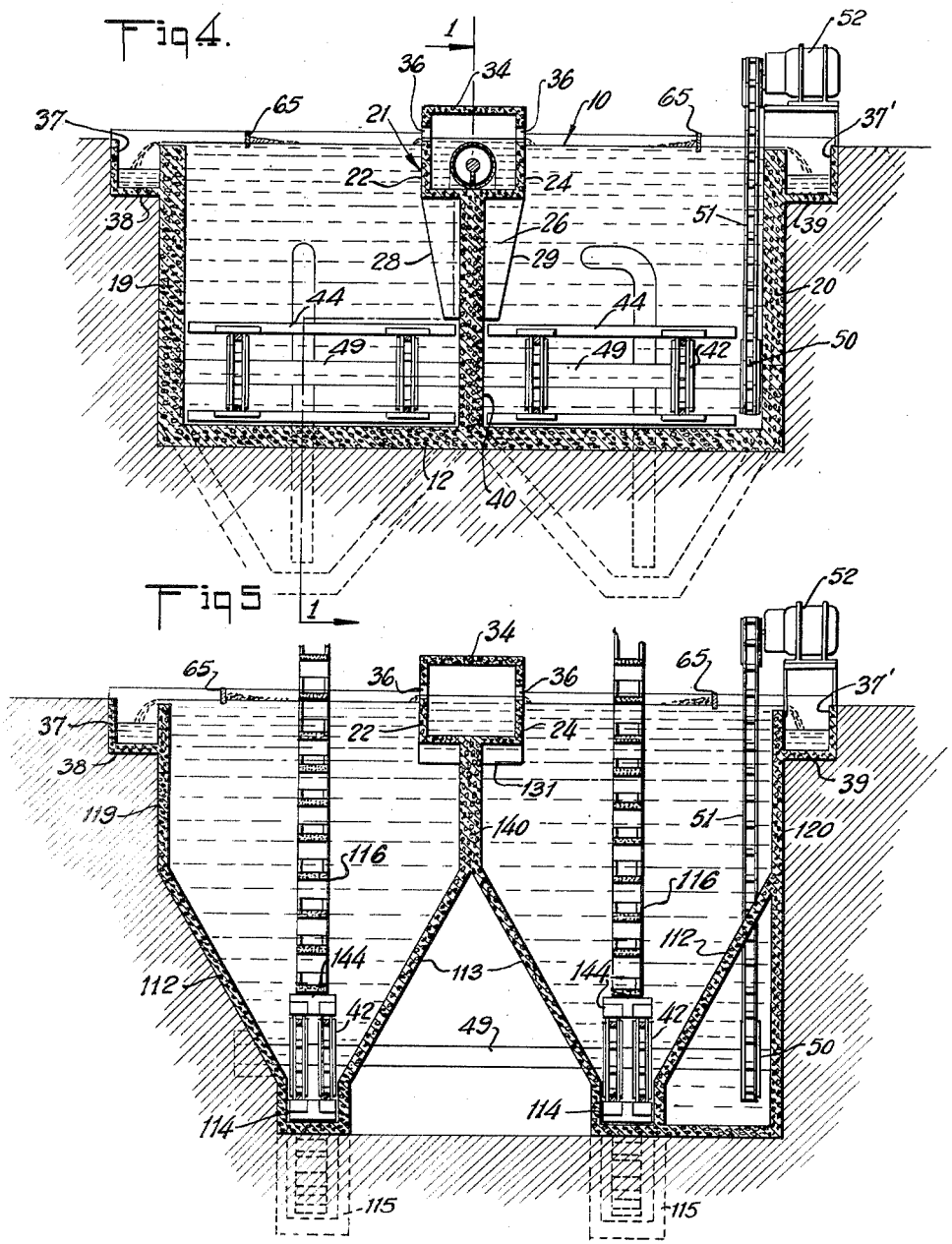

Aug. 1, 1950  T. R. KOMLINE  2,517,117
CLARIFIER
Filed Sept. 17, 1946  4 Sheets-Sheet 4
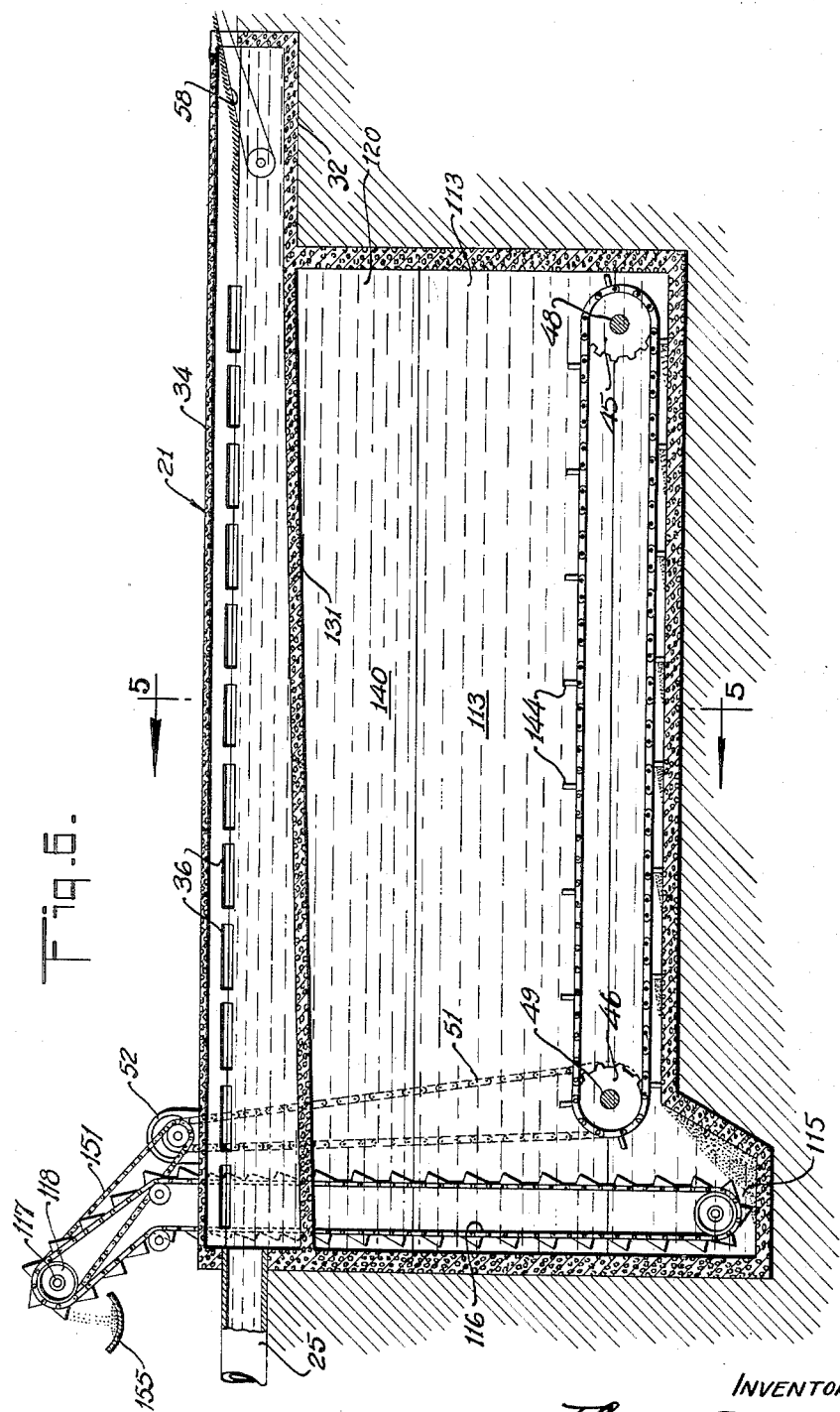
INVENTOR:
Thomas R. Komline
By Williams, Rick & Thoma
ATTORNEYS Patented Aug. 1, 1950

2,517,117

UNITED STATES PATENT OFFICE 2,517,117

CLARIFIER

Thomas R. Komline, Glen Rock, N. J., assignor to Komline-Sanderson Engineering Corporation, Ridgewood, N. J., a corporation of New Jersey Application September 17, 1946, Serial No. 697,522

10 Claims. (Cl. 210—3)

This invention relates to apparatus for clarifying liquids containing suspended materials, such as sanitary sewage and industrial wastes.

The suspended materials in sanitary sewage fall into three general classifications: (1) heavy inorganic matter, commonly called "grit"; (2) materials having a specific gravity less than that of water, such as fats, oils and grease, which will float under quiescent conditions; and (3) matter having a specific gravity slightly greater than that of water which will settle as a "sludge" under quiescent conditions. Various industrial wastes, such as those produced by steel mills, rubber reclaiming etc., may contain one or more of the foregoing types of materials. Steel rolling mill waste, for example, includes cooling water, oil used for lubrication in the rolling mill and scale washed from the steel.

In disposing of such wastes it is desired to remove from the mother liquor such suspended matter as is described above so that a clarified effluent is produced substantially devoid of solids or scum-forming materials. As will be evident, the invention may likewise be employed for the classification and separation of solids of various kinds from fluids in fields other than sewage and waste disposal, as in various aspects of chemical or mineral processing.

The principal object of the invention is to provide a unitary apparatus adapted to remove from a fluid suspension all of the undesirable matter and to discharge a clarified effluent substantially devoid of solids and floating materials.

Another object is to provide a clarifier of improved design and greater efficiency producing a better distribution of fluid suspension in a settling tank wherein slow-settling solids are removed.

A further object is to provide improved means for collecting and removing floatable materials which will gather on the liquid surface as a scum, said means effectively preventing such scum from running off with the effluent from the clarifier.

A still further object is to provide a clarifier particularly effective in removing dense solids such as rolling mill scale from liquids in which they are suspended.

Other objects and advantages will in part appear and in part will be obvious from the following detailed description of the present preferred embodiments of the invention, given by way of illustration and taken in conjunction with the drawings in which:

Fig. 1 is a longitudinal sectional elevation through a complete clarifier taken generally on the line 1—1 of Fig. 4;

Fig. 2 is a similar view of the rear end of the influent compartment showing means for removing floating materials gathered as a scum on the surface of the liquid in the quiescent zone created at the end of said compartment;

Fig. 4 is a vertical cross-section taken on the line 4—4 of Fig. 3;

Fig. 5 is a similar view of a modified form of the invention taken on the line 5—5 of Fig. 6; and Fig. 6 is a longitudinal sectional elevation of the structure shown in Fig. 5.

Figure 3:
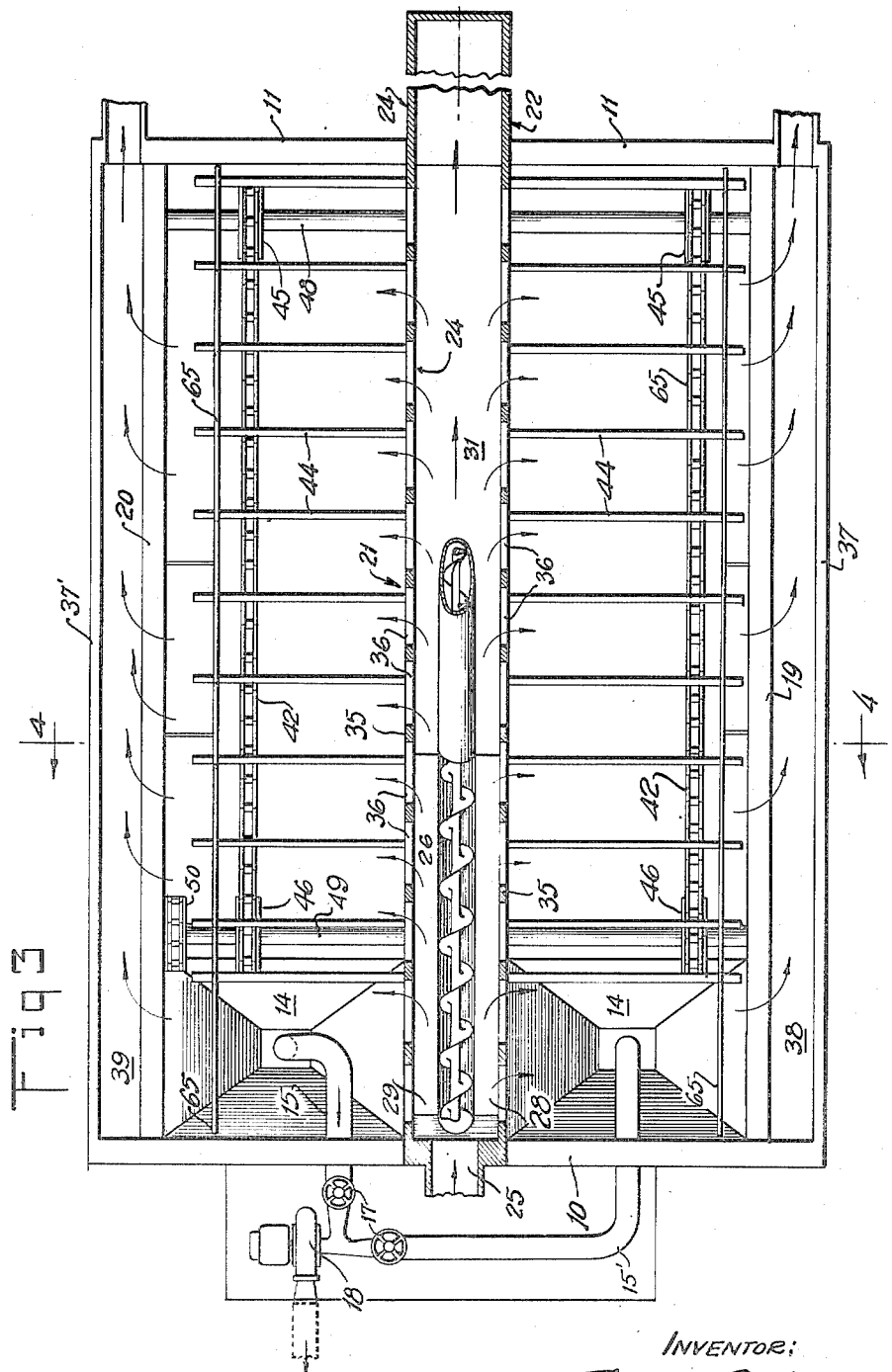
Fig. 3 is a top plan view of the clarifier shown in Fig. 1 and taken on the line 3—3 thereof.

Referring to Figs. 1, 3 and 4, the clarifier comprises an elongated tank made of reinforced concrete or the like having a front end wall 10, a rear end wall 11 and a bottom 12. Preferably at the forward end of the bottom sumps 14 or sludge hoppers are provided into which extend pipes 15 and 15' having open ends 16 and valves 17 and connected to a pump 18 adapted to suck out the material collected in the sumps. Valves 17 permit selective connection of the pipes 15, 15' to pump 18. The tank has outer side walls 19 and 20 which in this embodiment are vertical. Such a tank may, for example, be 40 feet long, 25 feet wide and 12 feet deep, although the specific size in any particular installation will depend upon the volume and nature of the fluid to be handled and similar considerations.

Extending down the middle of the tank longitudinally thereof is an influent compartment, generally indicated at 21, having parallel vertical side walls 22 and 24. Fluid enters the influent compartment through a pipe 25, flowing from the front to the rear end thereof. The bottom of this compartment, at the entrance end, slopes upwardly from the front wall 10, as shown at 26, so that a hopper is provided at the entrance end of the influent compartment. The side walls 28 and 29 of this hopper portion converge somewhat toward the bottom, as best shown in Fig. 4. From the point 30, which is the end of the upwardly sloping portion 26, the bottom of the influent compartment slopes less steeply upward, as shown at 31, to its junction with the end wall 11 and thence extends horizontally at 32 for a distance beyond the end of the tank proper. The influent compartment may be closed by a cover 34 which is supported above the top edges of the side walls 22 and 24 on legs 35 between which are apertures 36 extending throughout substantially the entire length of that portion of the influent compartment which overlies the tank.

Referring to Fig. 4, the top edges of the side walls 19 and 20 serve as effluent weirs and are at a slightly lower level than the top edges of the side walls 22 and 24 of the influent compartment. Extending along the sides of the walls 19 and 20 on the outside thereof are effluent channels having side walls 37 and 37' and bottoms 38 and 39.

The bottom portions 26 and 31 of the influent compartment 21 may be supported from the bottom 12 of the tank on a web 40 which divides the tank longitudinally into two settling compartments.

Extending along the flat bottom portions of the two settling compartments are sludge or solids scrapers comprising endless chains 42 carrying flights 44, the chains running over sprockets 45 and 46, mounted on rotatably mounted shafts 48 and 49 respectively. The web 40 is provided with suitable openings through which the shafts 48 and 49 extend. Attached to one of the shafts, for example the forward shaft 49, is a driving sprocket 50, driven by a chain 51, which may be powered by a motor 52 equipped with speed reduction gears. The scrapers move in the direction indicated by the arrows so as to scrape solids or sludge settling to the bottom of the tank along the bottom and into the sumps 14 where it may be removed through the pipes 15 and 15'.

Extending upwardly along the bottom portion 26 of the influent compartment is a screw conveyor 54 which will withdraw material from the hopper and discharge it into a trough 55. The conveyor may be driven by a motor 56.

As best shown in Fig. 2, the rear end or extension of the influent compartment may be provided with means for withdrawing floating materials from the surface of the liquid. Such means may consist of an endless belt 58 operating over rollers 59 and 60 and an idler roller 61. A scraper 62 removes material from the belt 58 as it passes over the roller 60 causing it to drop into a trough 64. The forward end of this conveyor dips slightly below the normal liquid level in the compartment 21 and may be run continuously by any suitable means. That small amount of floatable or scum-forming material which does pass into the settling compartments may be checked by longitudinal strips 65 which dip just below the water level in the settling tanks and behind which floating matter will accumulate. Periodically it can be skimmed off by hand.

The operation of the apparatus above described is as follows: Fluid carrying suspended solids and floatable material continuously enters the influent compartment 21 through pipe 25. Grit suspended in the fluid drops immediately into the hopper at the forward end of said compartment and is continuously removed therefrom by the conveyor 54. In the influent compartment, floatable materials such as oils, grease and the like, rise to the surface of the liquid and are carried by its longitudinal movement into the quiescent area which exists in the extension of the influent compartment above the bottom wall portion designated 32. Such floatable materials form a scum which is continuously crowded into this extension of the compartment and is continuously removed on the belt 58. The remainder of the material flows slowly out of the influent compartment over the top edges of its side walls 22 and 24, thus changing direction and flowing across the width of the two settling compartments toward the side walls 19 and 20. It will be observed that the sloping bottom wall of the influent compartment provides a compartment having a cross-sectional area which diminishes from the forward end toward the rear end, and an even distribution of fluid is thus obtained into the settling compartments, the liquid in which is relatively quiescent and from which light solids or sludge gradually precipitate to the bottom where they are moved toward the sump 14 by the flights 44. Thus, in a single apparatus, grit, sludge and floating materials are effectively removed and the effluent passing over the walls 19 and 20 has been effectively cleaned.

Referring to Figs. 5 and 6, a modified form of clarifier is shown particularly adapted for the handling of steel mill wastes which carry quantities of scale and a certain amount of oil. Many of the features of the construction described above in connection with Figs. 1-5 are the same and are indicated by the same reference characters. The principal differences in this embodiment of the invention are the omission of the grit hopper so that the bottom wall 131 of the influent compartment has a continuous slope from the forward end to the rear end. The side walls 119 and 120, together with the central web 140, are of less depth and are continuous with downwardly converging bottom walls 112 and 113 which terminate in sludge or solids concentrating channels 114. The flights 144 carried on the chains 42 are correspondingly shorter so that they are better adapted to move the dense and heavy scale or similar solid materials along these channels. The two sludge channels empty into sumps 115 at the forward end of the tank from which the sludge may be removed by endless bucket conveyors 116 driven by motor 52 through a chain 151 which is adapted to rotate shaft 117 to which drive sprockets 118 are fixed. The conveyors discharge into a trough 155 which carries off the solids for disposal. The operation of this modified form of the invention is in general the same as that of the form first described, except that no separate provision is made for the removal of grit prior to the discharge of the influent into the settling tanks.

The embodiments hereinbefore described in detail are given merely for purposes of illustration and the invention is not to be considered as limited to the details thereof but should be construed broadly within the purview of the claims.

What is claimed is:

1. A clarifier for removing non-floating solids from fluid suspensions comprising, an elongated settling tank to remove sludge, means for gathering settled sludge at one part of the bottom of said tank and removing it therefrom, means for operating said gathering and removing means, an influent compartment extending centrally of said tank along the length thereof and adapted to discharge fluid over its long sides close to the operating liquid level in said tank throughout substantially its entire length, the cross-sectional area of said compartment diminishing from its forward end toward its rear end, the long sides of said tank serving as effluent weirs whereby the fluid flows from the middle of said tank across the width thereof toward said long sides of the tank, means for introducing fluid into said influent compartment, and means for receiving the effluent from said tank and carrying it off as a clarified fluid.

2. A clarifier for removing non-floating solids and floating materials from fluid wastes comprising, an elongated settling tank to remove said solids, means for gathering settled solids at one part of the bottom of said tank and removing them therefrom, means for operating said gathering and removing means, an influent compartment extending centrally of said tank along the length thereof and adapted to discharge fluid over its sides close to the operating liquid level in said tank throughout substantially its entire length, said compartment at its rear end having an extension closed on three sides to provide a quiescent zone beyond the end of the tank for the accumulation of floating materials, the long sides of said tank serving as effluent weirs, means for introducing fluid into said influent compartment, and means for receiving the effluent from said tank and carrying it off as a clarified fluid.

3. A clarifier for removing non-floating solids and floating materials from fluid wastes comprising, an elongated settling tank to remove said solids, means for gathering settled solids at one part of said tank and removing them therefrom, means for operating said gathering and removing means, an influent compartment extending centrally of said tank along the length thereof and adapted to discharge fluid over its sides close to the operating liquid level in said tank throughout substantially its entire length, the rear end of said compartment being closed on three sides to provide a quiescent zone for the accumulation of floating materials, the long sides of said tank serving as effluent weirs whereby the flow in said tank is outwardly from the middle across the width thereof, means for introducing fluid into said influent compartment, and means for receiving the effluent from said tank and carrying it off as a clarified fluid.

4. A clarifier for removing rapidly settling grit and slow-settling sludge from fluid wastes comprising, an elongated settling tank to remove said sludge, means for gathering settled sludge at one part of said tank and removing it therefrom, means for operating said gathering and removing means, an influent compartment extending centrally of said tank along the length thereof and adapted to discharge fluid over its sides close to the operating liquid level in said tank throughout substantially its entire length, the forward end of said compartment being deepened to form a grit settling hopper, conveyor means for removing grit from said hopper, means for operating the conveyor means, that portion of said compartment extending from said hopper to the rear end having a diminishing cross-sectional area, the long sides of said tank serving as effluent weirs, means for introducing fluid into said influent compartment, and means for receiving the effluent from said tank and carrying it off as a clarified fluid.

5. A clarifier for removing grit, sludge and floating materials from fluid wastes comprising, an elongated settling tank to remove sludge, means for gathering settled sludge at one part of said tank and removing it therefrom, means for operating said gathering and removing means, an influent compartment extending centrally of said tank along the length thereof and adapted to discharge fluid over its sides close to the operating liquid level in said tank throughout substantially its entire length, the forward end of said compartment being deepened to form a grit settling hopper, conveyor means for removing grit from the bottom of said hopper, means for operating the conveyor means, the rear end of said compartment being closed on three sides to provide a quiescent zone for the accumulation of floating materials, means for removing said materials from said zone, the long sides of said tank serving as effluent weirs whereby the flow in said tank is outwardly from the middle across the width thereof, means for introducing fluid into said influent compartment, and means for receiving the effluent from said tank and carrying it off as a clarified fluid.

6. A clarifier for removing rapidly settling grit and slowly settling sludge from fluid wastes comprising, an elongated settling tank to remove sludge, means for moving settled sludge to one end of said tank, means for operating said moving means, means for removing the collected sludge, means for operating said removing means, an influent compartment of uniform width extending centrally of said tank along the length thereof and adapted to discharge fluid over its long sides close to the operating liquid level in said tank throughout substantially its entire length, the bottom of said compartment being steeply sloped at its forward end to form a grit settling hopper and gradually sloped upwardly toward its rear end, conveyor means for removing grit from the bottom of said hopper and extending along the sloping bottom thereof, means for operating the conveyor means, the long sides of said tank serving as weirs over which clarified effluent is discharged, means for introducing fluid into said influent compartment, and means for receiving said effluent and carrying it off as a clarified fluid.

7. A clarifier for removing dense non-floating solids from fluid wastes comprising a pair of elongated settling tanks arranged side by side, the side walls of said tanks converging inwardly at the bottom and terminating in sludge channels, scraping means moving longitudinally of said channels, means for removing the accumulated sludge, means for operating said scraping and removing means, an influent compartment extending longitudinally of the junction of said tanks and adapted to discharge over its long sides into said tanks close to the operating liquid level in said tank, the outer walls of said tanks serving as effluent weirs, means for introducing fluid into said influent compartment, and conduits extending along the tanks adjacent said weirs to convey the effluent.

8. A clarifier for removing dense non-floating solids and floating materials from fluid wastes comprising a pair of elongated settling tanks arranged side by side, the side walls of said tanks converging inwardly at the bottom and terminating in solids concentrating channels, scraping means adapted to move solids along said channels, means for receiving and removing accumulated solids, means for operating said scraping and removing means, an influent compartment extending longitudinally of the junction of said tanks and adapted to discharge over its long sides into said tanks close to the operating liquid level in said tank, said channel being closed on three sides throughout a portion of its rear end to provide a quiescent zone for the accumulation of floating materials, the outer wall of each of said tanks serving as an effluent weir whereby the fluid flow is across the width of each tank from said influent compartment toward said outer wall, means for introducing fluid into said influent compartment, and means for receiving the effluent passing over said weirs.

9. A clarifier for removing non-floating solids from fluid suspensions comprising, an elongated settling tank to remove sludge, an influent compartment extending centrally of said tank along the length thereof and adapted to discharge fluid over its long sides close to the operating liquid level in said tank throughout substantially its entire length, the long sides of said tank serving as effluent weirs whereby the fluid flows from the middle of said tank across the width thereof toward said long sides of the tank, means for introducing fluid into said influent compartment, and means for receiving the effluent from said tank and carrying it off as a clarified fluid.

10. In a clarifier having a settling tank for the removal of sludge, an influent compartment adapted to feed fluid including floating materials into said tank, and means for introducing fluid into said compartment, said compartment having an extension extending in the direction of fluid flow therein, said extension having no outlet through which fluids can flow, whereby the flowing fluid will cause said materials to accumulate in said extension over quiescent liquid, and means for continuously skimming said materials from the surface of the fluid in said extension.

THOMAS R. KOMLINE.

REFERENCES CITED

The following references are of record in the file of this patent:

UNITED STATES PATENTS

| Number | Name | Date |
|---|---|---|
| 1,646,478 | Elrod | Oct. 25, 1927 |
| 1,702,612 | Morse | Feb. 19, 1929 |
| 1,762,593 | Schwarz | June 10, 1930 |
| 2,136,400 | Steindorf | Nov. 15, 1938 |
| 2,160,838 | Dorr | June 6, 1939 |
| 2,186,371 | Durdin, Jr. | Jan. 9, 1940 |
| 2,226,532 | Hawley | Dec. 31, 1940 |
| 2,266,937 | Tark | Dec. 23, 1941 |
| 2,272,441 | Streander | Feb. 10, 1942 |